United States Patent
Krajcirovic et al.

(10) Patent No.: US 12,000,751 B2
(45) Date of Patent: Jun. 4, 2024

(54) OUTSIDE HEAT EXCHANGER THAW AND FREEZE TEST APPARATUS

(71) Applicant: Hanon Systems, Daejeon (KR)

(72) Inventors: Alex Krajcirovic, West Bloomfield, MI (US); Mike Kowalski, Ypsilanti, MI (US); Martin Kubasinski, Sterling Heights, MI (US); Bill Turnbul, Ann Arbor, MI (US)

(73) Assignee: HANON SYSTEMS, Daejeon (KR)

( * ) Notice: Subject to any disclaimer, the term of this patent is extended or adjusted under 35 U.S.C. 154(b) by 161 days.

(21) Appl. No.: 17/659,022

(22) Filed: Apr. 13, 2022

(65) Prior Publication Data

US 2023/0332972 A1 Oct. 19, 2023

(51) Int. Cl.
*G01G 1/00* (2006.01)
*G01M 1/02* (2006.01)
*G01M 1/16* (2006.01)
*G01M 1/32* (2006.01)
G01M 99/00 (2011.01)

(52) U.S. Cl.
CPC ............... *G01M 1/16* (2013.01); *G01G 1/00* (2013.01); *G01M 1/02* (2013.01); *G01M 1/32* (2013.01); *G01M 99/002* (2013.01)

(58) Field of Classification Search
None
See application file for complete search history.

(56) References Cited

U.S. PATENT DOCUMENTS

| 6,141,888 A | * | 11/2000 | Cammarata | F26B 25/225 |
|---|---|---|---|---|
| | | | | 34/202 |
| 2016/0349199 A1 | * | 12/2016 | Warminska | G01N 25/00 |
| 2017/0016810 A1 | * | 1/2017 | Dudda | G01N 25/00 |

FOREIGN PATENT DOCUMENTS

| CN | 102589900 A | 7/2012 | |
|---|---|---|---|
| CN | 109186921 A | 1/2019 | |
| DE | 102018210216 A1 * | 12/2019 | G01G 1/20 |

OTHER PUBLICATIONS

English Translation of DE-102018210216-A1 (Year: 2019).*

* cited by examiner

*Primary Examiner* — Alexander A Mercado
(74) *Attorney, Agent, or Firm* — Shumaker, Loop & Kendrick, LLP; James D. Miller (57) ABSTRACT

A testing apparatus includes a base structure and a supporting structure rotatably coupled to the base structure. The supporting structure includes an engaging portion configured to engage a liquid-retaining article. A load cell assembly connects the base structure to the supporting structure. The load cell assembly includes a load cell configured to measure a reaction force present between the base structure and the supporting structure resulting from an imbalance of the supporting structure about an axis of rotation thereof. The reaction force corresponds to a weight of liquid that has accumulated on the liquid-retaining article following a balancing of the supporting structure about the axis of rotation thereof.

19 Claims, 3 Drawing Sheets

OUTSIDE HEAT EXCHANGER THAW AND FREEZE TEST APPARATUS

FIELD OF THE INVENTION

The present invention relates generally to an apparatus for performing validation testing with respect to a heating exchanging structure, and more particularly, to an apparatus for determining factors such as the water saturation and the water retention of the heat exchanging structure.

BACKGROUND OF THE INVENTION

There exist various circumstances wherein a heat exchanging structure may encounter liquid water during use thereof. For example, heat exchanging structures utilized in automotive applications may encounter liquid water when water vapor originating from the ambient environment is condensed on the heat exchanging structure, or when external water is incidentally introduced into a flow path including the heat exchanging structure. Such liquid water may remain on the heat exchanging structure and be subject to freezing when exposed to low temperatures, such as when the corresponding vehicle is exposed to low ambient air temperatures. The freezing of such water may result in the formation of ice on the heat exchanging structure that can obstruct flow paths through the heat exchanging structure or alter a heat exchanging efficiency thereof. It is accordingly necessary to perform testing to determine various factors relating to the accumulation of water on the heat exchanging structure, the potential freezing of such water, and the subsequent thawing of such frozen water, in order to account for such scenarios.

One test that may be utilized is a water saturation test that involves measuring the maximum amount of water that can be accumulated and retaining on the heat exchanging structure when encountering a flow of water. Following the water saturation test, a water retention test may be performed to determine how passing a flow of air over the heat exchanging structure affects the amount of liquid water remaining on the heat exchanging structure following a duration of time of such flow. The described tests may accordingly be utilized to determine conditions relating to the heat exchanging structure being saturated with such water as well as the means necessary to remove a desired amount of the water from the heat exchanging structure, such as by blowing air over and/or through the heat exchanging structure at a desired flow rate for a desired period of time.

It has been discovered that such tests are difficult to perform accurately when attempting to account for the intended orientation of the heat exchanging structure when installed into a device such as an automobile. Specifically, the water flows across and accumulates on the heat exchanging structure in a specific manner depending on the orientation of the heat exchanging structure relative to the direction of the force of gravity and/or the direction of flow of the water/water vapor when encountering the heat exchanging structure, hence it is necessary to account for such factors in performing such tests in order to better mimic the conditions faced by the heat exchanging structure when in an installed configuration. However, the irregular shape and/or inclined orientation of such heat exchanging structures when in the installed position renders it difficult to conduct processes such as weighing the heat exchanging structure (along with the water accumulated thereon) for determining the amount of water instantaneously retained on the heat exchanging structure. This is the case due to the difficulty in supporting the heat exchanging structure at the intended orientation without negatively effecting the accuracy of the weighing process. Specifically, the supporting of the irregularly shaped or inclined heat exchanging structure may include various forces acting on the heat exchanging structure at locations and orientations rendering it difficult to accurately and efficiently measure a force corresponding to the weight of the heat exchanging structure, and especially with respect to different structures or different water retention levels.

It is accordingly desirable to provide a validation testing apparatus allowing for the accurate and efficient testing of factors such as the water saturation and/or the water retention of a corresponding heat exchanging structure.

SUMMARY OF THE INVENTION

Concordant and congruous with the present invention, a novel validation testing apparatus allowing for the testing of a heat exchanging structure with respect to installation conditions has surprisingly been discovered.

According to an embodiment of the present invention, a testing apparatus includes a base structure and a supporting structure rotatably coupled to the base structure. The supporting structure includes an engaging portion configured to engage a liquid-retaining article. A load cell assembly connects the base structure to the supporting structure. The load cell assembly includes a load cell configured to measure a reaction force present between the base structure and the supporting structure resulting from an imbalance of the supporting structure about an axis of rotation thereof. The reaction force corresponds to a weight of liquid that has accumulated on the liquid-retaining article following a balancing of the supporting structure about the axis of rotation thereof.

According to additional aspects of the present invention, the testing apparatus may further include a counterweight assembly coupled to the supporting structure and configured to balance the supporting structure about the axis of rotation thereof prior to the liquid accumulating on the liquid-retaining article. The counterweight assembly may include a counterweight, wherein a distance the counterweight is spaced from a vertically extending plane arranged parallel to and passing through the axis of rotation of the supporting structure is adjustable to balance the supporting structure about the axis of rotation thereof prior to the liquid accumulating on the liquid-retaining article. A center of mass of the liquid-retaining article and the counterweight assembly may be disposed to opposing sides of the vertically extending plane. The load cell and the center of mass of the liquid-retaining article may each be spaced an equal distance from the vertically extending plane arranged parallel to and passing through the axis of rotation of the supporting structure. Furthermore, each of the center of mass of the liquid-retaining article and the load cell may be disposed to a first side of the vertically extending plane while the counterweight assembly is disposed to an opposing second side of the vertically extending plane.

The load cell assembly may further include a first connecting portion coupled to the base structure and a second connecting portion coupled to the supporting structure with the load cell vertically arranged between the first connecting portion and the second connecting portion. The first connecting portion may be disposed at a same height as the axis of rotation of the supporting structure with respect to a vertical direction. The first connecting portion and a center of mass of the liquid-retaining article are each spaced an equal distance from a vertically extending plane arranged parallel to and passing through the axis of rotation of the supporting structure.

The liquid-retaining article may be a heat exchanging structure configured to be installed in a vehicle, and the engaging portion of the supporting structure may be configured to orient the heat exchanging structure at an inclination corresponding to an inclination of the heat exchanging structure when installed in the vehicle.

The supporting structure may form a tunnel configured to direct a flow of air therethrough, wherein the flow of air is configured to remove at least a portion of the water accumulated on the liquid-retaining article. The tunnel may be inclined relative to a vertical direction. The tunnel may be in fluid communication with a blower assembly configured to direct the flow of air through the tunnel. In some embodiments, the base structure forms an outer tunnel and the supporting structure forms an inner tunnel disposed within the outer tunnel, wherein a flow space of the outer tunnel is in fluid communication with a flow space of the inner tunnel.

The testing apparatus may further include a fluid delivery device configured to deliver liquid to the liquid-retaining article for accumulation thereon.

According to another embodiment of the present invention, a testing apparatus includes an outer tunnel, an inner tunnel disposed within and rotatably coupled to the outer tunnel with the inner tunnel including an engaging portion configured to engage a liquid-retaining article, a blower assembly in fluid communication with each of the outer tunnel and the inner tunnel with the blower assembly configured to selectively direct a flow of air through the inner tunnel, a load cell assembly, and a counterweight assembly. The load cell assembly connects the outer tunnel to the inner tunnel at a position spaced horizontally from an axis of rotation of the inner tunnel. The load cell assembly includes a load cell configured to measure a reaction force present between the outer tunnel and the inner tunnel resulting from an imbalance of the inner tunnel about the axis of rotation thereof. The reaction force corresponds to a weight of liquid that has accumulated on the liquid-retaining article following a balancing of the inner tunnel about the axis of rotation thereof. The counterweight assembly is coupled to the inner tunnel and configured to balance the inner tunnel about the axis of rotation thereof prior to the liquid accumulating on the liquid-retaining article.

A method is also disclosed according to the present invention. A method of operating a testing apparatus comprising: providing a base structure, a supporting structure, and a load cell assembly, the supporting structure rotatably coupled to the base structure and the load cell assembly connecting the base structure to the supporting structure at a position spaced from an axis of rotation of the supporting structure; supporting a liquid-retaining article on an engaging portion of the supporting structure; balancing the supporting structure about the axis of rotation thereof after the liquid-retaining article is supported by the engaging portion; delivering liquid to the liquid-retaining article for accumulation thereon after the balancing of the supporting structure; and measuring a reaction force present between the base structure and the supporting structure resulting from an imbalance of the supporting structure about the axis of rotation thereof following an accumulation of the liquid on the liquid-retaining article, wherein the reaction force is measured by a load cell of the load cell assembly and corresponds to a weight of the liquid that has accumulated on the liquid-retaining article.

According to additional aspects of the disclosed method, a liquid saturation test performed via use of the testing apparatus may include the delivering step occurring until the reaction force reaches a maximum value indicating that the liquid-retaining article is saturated with the liquid. The method may also further include a step of passing air over the liquid-retaining article following the delivering of the liquid thereto. A liquid retention test performed via use of the testing apparatus may include comparing the reaction force measured by the load cell prior to the passing of the air over the liquid-retaining article to the reaction force measured by the load cell after the passing of the air over the liquid-retaining article to determine a weight of the liquid removed from the liquid-retaining article during the passing of the air over the liquid-retaining article.

BRIEF DESCRIPTION OF THE DRAWINGS

The above, as well as other advantages of the present invention, will become readily apparent to those skilled in the art from the following detailed description of a preferred embodiment when considered in the light of the accompanying drawings.

DETAILED DESCRIPTION OF EXEMPLARY EMBODIMENTS OF THE INVENTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
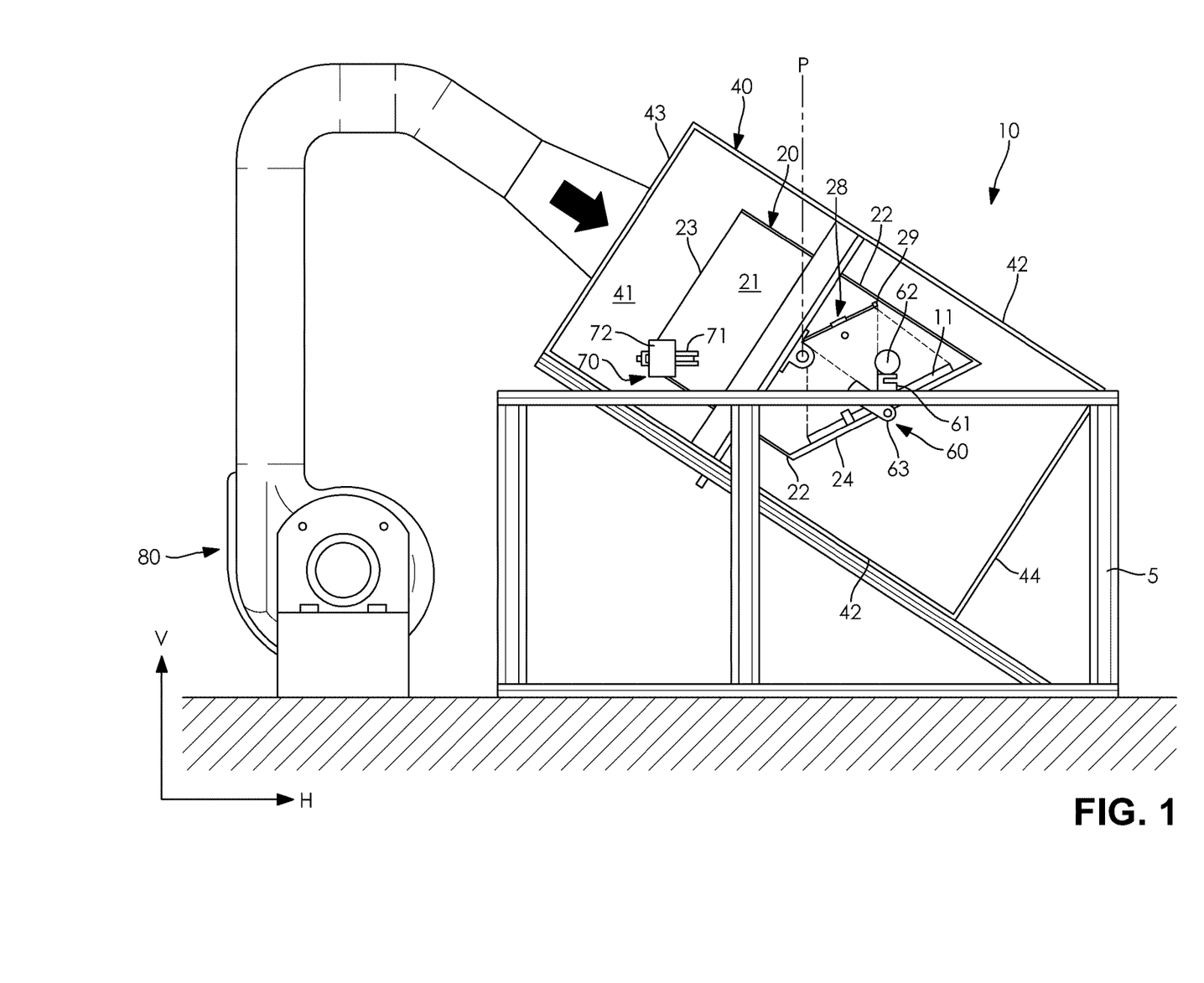
FIG. 1 is a left side elevational view of a testing apparatus according to an embodiment of the present invention.
Figure 2:
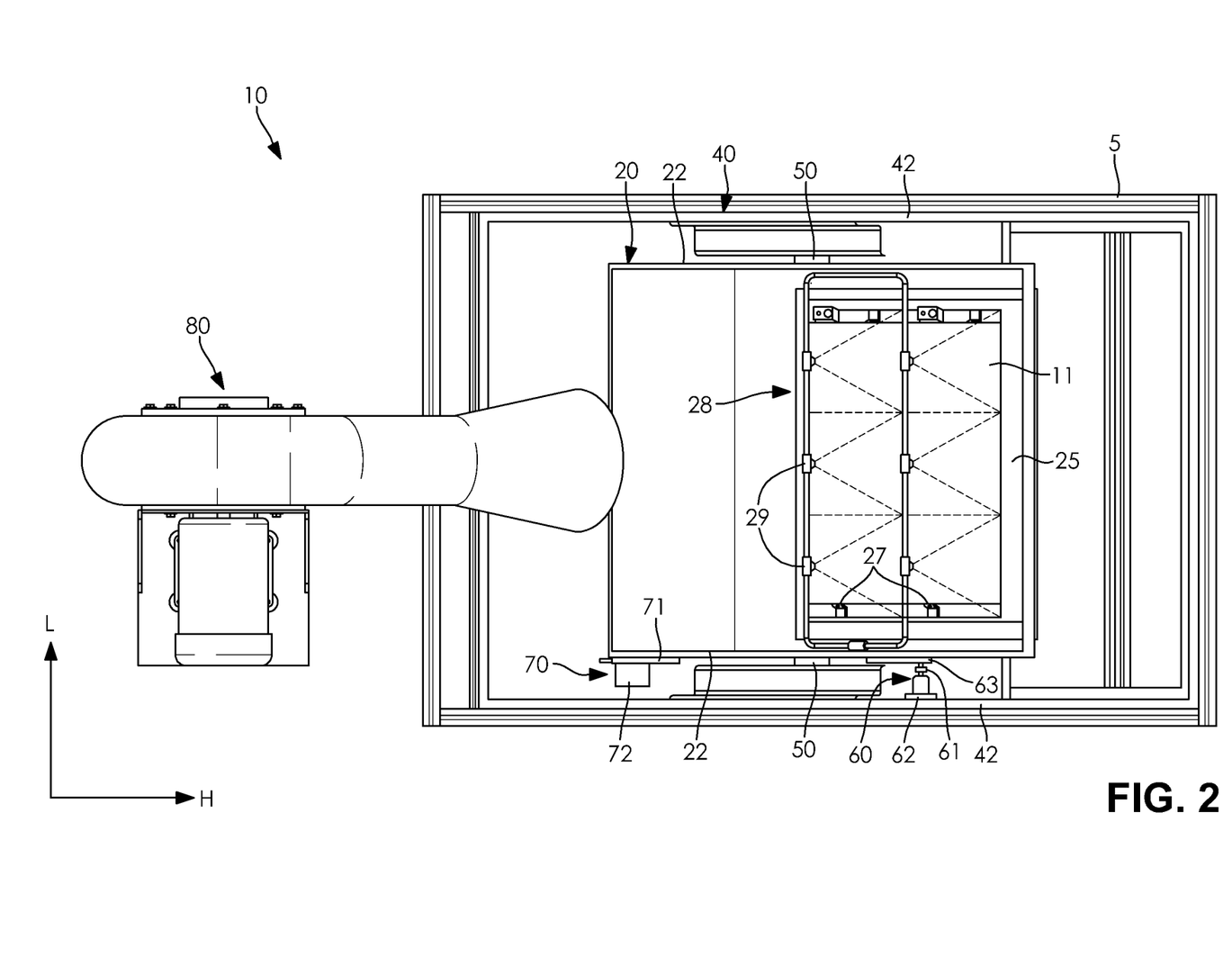
FIG. 2 is a top plan view of the testing apparatus of FIG. 1.
Figure 3:
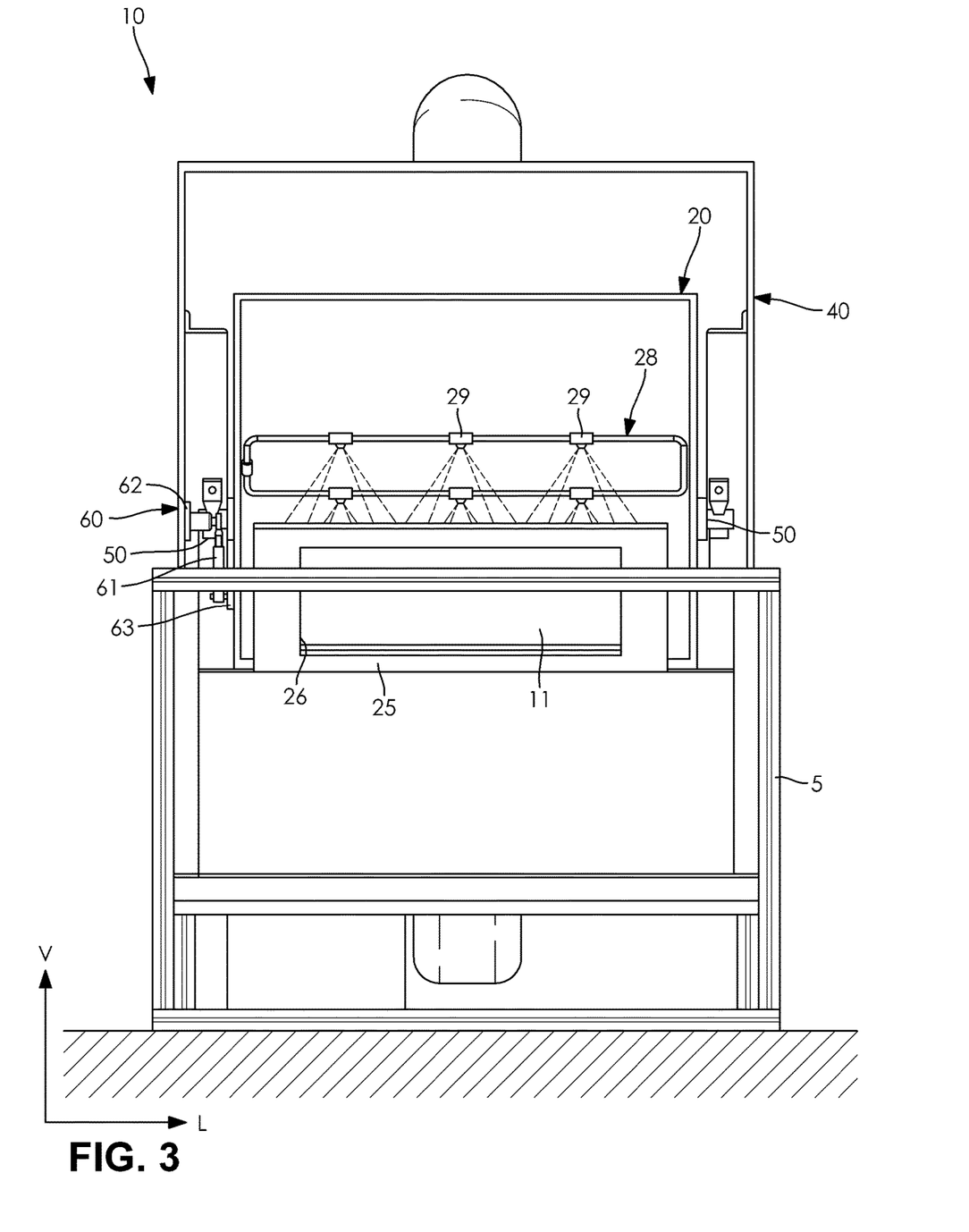
FIG. 3 is a front elevational view of the testing apparatus of FIG. 1.

FIGS. 1-3 illustrate a testing apparatus 10 according to an embodiment of the present invention. The testing apparatus 10 is configured to determine an amount of water retained on a heat exchanging structure 11 in order to perform water saturation and water retention tests with respect to the heat exchanging structure 11. However, it should be readily apparent to one skilled in the art that the testing apparatus 10 may be adapted to determine the saturation and retention of any liquid capable of accumulation on any liquid-retaining structure without necessarily departing from the scope of the present invention. As such, references hereinafter to the use of water with respect to the testing apparatus 10 may refer to any suitable liquid and references to the heat exchanging structure 11 may refer to any suitable liquid-retaining structure having a configuration tending to retain an accumulation of the liquid thereon in the manner described hereinafter.

The testing apparatus 10 is shown relative to three different perpendicular arranged axes H, L, and V. The axis H refers to a horizontally arranged axis having a positive direction extending at least partially in a direction of flow of air through the testing apparatus 10, where the term horizontally arranged refers to a direction that is arranged perpendicular to the direction of the force of gravity. The axis L refers to a horizontally arranged and laterally extending axis arranged perpendicular to the axis H, which results in the axis L also being arranged perpendicular to the direction of the flow of air through the testing apparatus 10. The axis V refers to a vertical axis arranged parallel to the direction of the force of gravity, which is also perpendicular to each of the axes H and L, wherein a positive direction along the V axis refers to an upward direction.

The heat exchanging structure 11 may have substantially any shape and configuration capable of retaining water thereon while remaining within the scope of the present invention. The heat exchanging structure 11 may form a portion of a thermal management system of a vehicle, wherein the heat exchanging structure 11 includes an installation orientation when installed into the corresponding vehicle for operational use. That is, the heat exchanging structure 11 may include one or more dimensions thereof arranged at an incline with respect to the axis V when the heat exchanging structure 11 is at the installation orientation, thereby resulting in the possibility that various surfaces of the heat exchanging structure 11 will be arranged such that water will flow downwardly therealong and other surfaces will be arranged to retain an accumulation of the water thereon. As explained hereinafter, the testing apparatus 10 accounts for this installation orientation in order to mimic the conditions faced by the heat exchanging structure 11 when placed at the installation orientation, such as when the heat exchanging structure 11 is installed into a corresponding vehicle for operational use thereof.

The heat exchanging structure 11 is illustrated herein as having a substantially planar and plate-like configuration, but the heat exchanging structure 11 may have other configurations without departing from the scope of the present invention. The heat exchanging structure 11 may include any configuration of heat exchanging features, such as surface area-increasing features like fins or ribs, in addition to any configuration of flow conveying passages formed therein and/or thereon. The heat exchanging structure 11 may be provided to include symmetry about at least one plane passing therethrough, including being substantially symmetric about a single plane passing therethrough, being substantially symmetric about a pair of perpendicular arranged planes passing therethrough, or being substantially symmetric about three different planes that are each arranged perpendicular to one another and passing through the heat exchanging structure 11, as non-limiting examples. The heat exchanging structure 11 may include a stacked configuration wherein the flow conveying passages (and corresponding heat exchanging features) formed therein are repeatedly disposed in a stacking direction of the heat exchanging structure 11. Regardless of the associated configuration, the heat exchanging structure 11 is provided to include a center of mass and/or gravity having a known (or determinable) position relative to the dimensions of the heat exchanging structure 11, hence the position of the center of mass/gravity of the heat exchanging structure 11 is able to be determined for any position and orientation of the heat exchanging structure 11 relative to the remainder of the testing apparatus 10.

The testing apparatus 10 includes an inner tunnel 20 rotatably coupled to a surrounding outer tunnel 40. The inner tunnel 20 includes a flow space 21 formed therein while the outer tunnel 40 includes a flow space 41 formed therein. The inner tunnel 20 is disposed entirely within the flow space 41 of the outer tunnel 40. The inner tunnel 20 and the outer tunnel 40 may each be supported by a frame structure 5 resting on a ground surface.

The inner tunnel 20 includes at least one sidewall 22 extending in parallel to a direction of flow of air through the inner tunnel 20 during certain operational modes of the testing apparatus 10, as explained hereinafter. Each of the sidewalls 22 may be formed at least partially from a transparent material providing visual access to the flow space 21 of the inner tunnel 20 for monitoring a testing process, hence the ability to see the internal components of the inner tunnel 20 from an exterior of the testing apparatus 10 as depicted in each of FIGS. 1-3.

In the present embodiment, the inner tunnel 20 includes four of the sidewalls 22 arranged into a rectangular configuration including opposing upper and lower sidewalls 22 and opposing lateral sidewalls 22, thereby forming a rectangular flow cross-section through the inner tunnel 20 that is arranged perpendicular to the direction of flow of the air passing through the inner tunnel 20. The sidewalls 22 extend from an inlet end 23 of the inner tunnel 20 to an outlet end 24 thereof, wherein the inlet end 23 refers to an upstream end of the inner tunnel 20 in which air first enters the flow space 21 of the inner tunnel 20 from the surrounding flow space 41 of the outer tunnel 40 and the outlet end 24 refers to a downstream end of the inner tunnel 20 from which the air passing therethrough is discharged to the surrounding flow space 41 of the outer tunnel 40.

The inner tunnel 20 is shown in FIGS. 1-3 as being disposed at an incline with respect to each of the H and V axes such that the air passing through the inner tunnel 20 flows with the same incline when encountering the heat exchanging structure 11. The incline of the inner tunnel 20 may be selected to match an incline of air encountering the heat exchanging structure 11 when the heat exchanging structure 11 is installed into the corresponding vehicle at the previously described installation orientation. That is, the sidewalls 22 of the inner tunnel 20 may be inclined relative to the axes H and V such that the direction of flow of the air through the inner tunnel 20 from the inlet end 23 to the outlet end 24 thereof substantially corresponds to a direction of flow of air over the heat exchanging structure 11 when the heat exchanging structure 11 is installed into the vehicle at the installation orientation, thereby allowing for the testing apparatus 10 to mimic the conditions faced by the heat exchanging structure 11 during operation thereof. For example, the heat exchanging structure 11 may be configured for fluid and heat exchange communication with ambient air encountering the vehicle when the heat exchanging structure 11 is in the installation orientation, hence the testing apparatus 10 may include the inner tunnel 20 arranged at an inclination mimicking such air flow conditions.

In the present embodiment, the inner tunnel 20 is inclined downwardly such that the air passing through the flow space 21 flows partially horizontally along the positive direction of the axis H and partially vertically downwardly along the negative direction of the axis V when flowing from the inlet end 23 to the outlet end 24 of the inner tunnel 20. However, other angles of inclination may be selected to correspond to different installation air flow orientations, including the air flowing at least partially vertically upward with an incline opposing that shown and described. The testing apparatus 10 may alternatively include the inner tunnel 20 arranged to extend exclusively in the direction of the axis H or the direction of the axis V, as desired, depending on the desired direction of air flow over the heat exchanging structure 11 in accordance with the corresponding operating conditions. As used hereinafter, the direction of flow of the air when passing over the heat exchanging structure 11 when in the installation orientation may be referred to as the installation air flow orientation of the heat exchanging structure 11. Using this definition, the inner tunnel 20 may be said hereinafter to be inclined at the installation air flow orientation of the heat exchanging structure 11.

The inlet end 23 of the inner tunnel 20 may be arranged perpendicular to the direction of flow of the air through the inner tunnel 20 while the outlet end 24 thereof may be arranged at an inclination with respect to the axes H and V, thereby resulting in the outlet end 24 also being arranged at an incline relative to the inlet end 23. The angle of inclination of the outlet end 24 may be selected to match the installation orientation of the heat exchanging structure 11. In the present example, the outlet end 24 of the inner tunnel 20 is inclined to progress upwardly along the positive direction of the axis V when progressing in the positive direction of the axis H.

The outlet end 24 of the inner tunnel 20 may include an engaging portion 25 extending between the sidewalls 22 for engaging and supporting the heat exchanging structure 11, wherein the engaging portion 25 is configured to support the heat exchanging structure 11 at the installation orientation. For example, a support surface of the engaging portion 25 may be inclined to match the installation orientation of the heat exchanging structure 11 such that the heat exchanging structure 11 can rest on the support surface while maintained at the installation orientation during operation of the testing apparatus 10. The engaging portion 25 may include one or more openings 26 allowing the air passing through the inner tunnel 20 to exit the flow space 21 thereof at the outlet end 24 thereof. The openings 26 may be in fluid communication with air having passed directly through the heat exchanging structure 11, which may facilitate the ability for water to be removed from the heat exchanging structure 11 through the one or more openings 26 during certain tests able to be performed via the testing apparatus 10. In some embodiments, the one or more openings 26 may be positioned, shaped, and dimensioned to match a downstream-arranged flow path within the vehicle when the heat exchanging structure 11 is placed in the installation orientation such that air passing through the one or more openings 26 mimics the flow path of air passing through the heat exchanging structure 11 during operational use thereof.

The engaging portion 25 may further include one or more locating features 27 or coupling features 27 configured to mate with or otherwise engage the heat exchanging structure 11 to affix a position of the heat exchanging structure 11 relative to the inner tunnel 20. The heat exchanging structure 11 is affixed to the inner tunnel 20 at a position between the axis of rotation of the inner tunnel 20 and the outlet end 24 thereof. More specifically, the heat exchanging structure 11 is affixed to the inner tunnel 20 at a position wherein the center of mass/gravity of the heat exchanging structure 11 is disposed to one side of a vertically and laterally arranged plane P passing through an axis of rotation of the inner tunnel 20 relative to the outer tunnel 40. The affixing of the heat exchanging structure 11 to the inner tunnel 20 results in an ability to determine a position of the center of mass/gravity of the heat exchanging structure 11 relative to the remainder of the testing apparatus 10, and especially the axis of rotation of the inner tunnel 20 relative to the outer tunnel 40, as explained in greater detail during discussion of a method of operation of the testing apparatus 10.

The inner tunnel 20 further includes a liquid delivery device 28 disposed within the flow space 21 and configured to selectively deliver water to the heat exchanging structure 11 during certain tests performed with respect to the testing apparatus 10. The liquid delivery device 28 is shown as a plurality of spray nozzles 29 having an orientation configured to distribute the water to the facing surfaces of the heat exchanging structure 11. Each of the spray nozzles 29 may be configured to generate a fine and uniform spray of the water. In the present embodiment, the spray nozzles 29 are oriented to deliver the water at an inclination substantially perpendicular to the incline of the outlet end 24 and the heat exchanging structure 11 to facilitate an even distribution of the water over the face of the heat exchanging structure 11. However, any position and orientation of the liquid delivery device 28 may be utilized so long as the heat exchanging structure 11 is encountered by the water in a manner facilitating the retention of at least some of the water thereon during operation of the testing apparatus 10. In other embodiments, the liquid delivery device 28 may be specifically positioned and oriented to mimic conditions faced by the heat exchanging structure 11 when in the installation orientation within the corresponding vehicle with respect to water entering the vehicle and encountering the heat exchanging structure 11. The liquid delivery device 28 may be mounted to the sidewalls 22 of the inner tunnel 20 at the desired position and orientation. The liquid delivery device 28 may be in fluid communication with a suitable liquid (water) source (not shown) for supplying the water during operation of the testing apparatus 10 via any necessary fluid lines (not shown) or the like.

The outer tunnel 40 includes a configuration similar to that of the inner tunnel 20. The outer tunnel 40 includes at least one sidewall 42 extending in parallel to the direction of flow of air through the outer tunnel 40 during certain operational modes of the testing apparatus 10, which also corresponds to the direction of flow of the air through the inner tunnel 20. Each of the sidewalls 42 may be formed at least partially from a transparent material providing visual access to the flow space 41 of the outer tunnel 40 for monitoring a testing process, hence the ability to see the components disposed within the outer tunnel 40 from an exterior of the testing apparatus 10 as depicted in each of FIGS. 1-3.

In the present embodiment, the outer tunnel 40 includes four of the sidewalls 42 arranged into a rectangular configuration including opposing upper and lower sidewalls 42 and opposing lateral sidewalls 42, thereby forming a rectangular flow cross-section through the outer tunnel 40 that is arranged perpendicular to the direction of flow of the air through the outer tunnel 40. The sidewalls 42 extend from first end 43 of the outer tunnel 40 to an opposing second end 44 thereof, wherein the first end 43 refers to an upstream end of the outer tunnel 40 and the second end 44 refers to a downstream end of the outer tunnel 40.

The outer tunnel 40 is shown in FIGS. 1-3 as being disposed at the same incline with respect to the H and V axes as the inner tunnel 20, which corresponds to the previously described installation air flow orientation. The outer tunnel 40 being disposed at the same inclination as the inner tunnel 20 aids in facilitating the air flowing through the different flow spaces 21, 41 in the same general direction as the air does not require sharp changes in direction when entering or exiting the inner tunnel 20. In the present embodiment, the outer tunnel 40 is inclined downwardly such that the air passing through the flow space 41 flows partially horizontally along the positive direction of the axis H and partially vertically downwardly along the negative direction of the axis V when flowing from the first end 43 to the second end 44 of the outer tunnel 40. However, other angles of inclination may be selected to correspond to different installation air flow orientations, including the air flowing at least partially vertically upwardly in opposing fashion to that shown and described. The testing apparatus 10 may alternatively include the outer tunnel 40 arranged to extend exclusively in the direction of the axis H or the direction of the axis V, as desired, depending on the desired direction of air flow over the heat exchanging structure 11 in accordance with the corresponding operating conditions.

As best shown in FIG. 2, the axis of rotation of the inner tunnel 20 relative to the outer tunnel 40 may be defined by one or more shaft elements 50 extending between the inner tunnel 20 and the outer tunnel 40 and arranged in parallel to the lateral axis L. Specifically, a first one of the shaft elements 50 may extend between a first lateral sidewall of the inner tunnel 20 and a first lateral sidewall of the outer tunnel 40 while a second one of the shaft elements 50 may extend between a second lateral sidewall of the inner tunnel 20 and a second lateral sidewall of the outer tunnel 40. In alternative embodiments, a single shaft element may extend laterally through each of the inner tunnel 20 and the outer tunnel 40, as desired.

The inner tunnel 20 is also connected to the outer tunnel 40 by a load cell assembly 60 in addition to the axis of rotation as formed by the at least one shaft element 50. The load cell assembly 60 extends laterally between the first one of the sidewalls 22 of the inner tunnel 20 and the first one of the sidewalls 42 of the outer tunnel 40 to one lateral side of the inner tunnel 20, as best shown in FIGS. 2 and 3. The load cell assembly 60 includes a load cell 61 configured to measure a vertically extending (parallel to the axis V) reaction force present between the inner tunnel 20 and the outer tunnel 40 resulting from an imbalance of the inner tunnel 20 about the axis of rotation thereof. The load cell assembly 60 includes a first connecting portion 62 at a first end thereof that is directly connected to the first one of the lateral sidewalls 42 of the outer tunnel 40 and a second connecting portion 63 at a second end thereof that is directly connected to the first one of the lateral sidewalls 22 of the inner tunnel 20. The load cell 61 extends vertically in parallel to the axis V between the first connecting portion 62 and the second connecting portion 63.

The first connecting portion 62 is positioned relative to the H and V axes to facilitate the ability of the testing apparatus 10 to perform the test described hereinafter. With respect to the V axis, the connecting portion 62 is disposed at the same height as the at least one shaft element 50 defining the axis of rotation of the inner tunnel 20. Disposing the shaft element 50 and the first connecting portion 62 at the same height results in any tendency of the inner tunnel 20 to rotate about the axis of rotation thereof to result in the first connecting portion 62 initially tending to move tangentially to the rotational motion thereof, which corresponds to a vertical direction parallel to the axis V. As such, any reaction force present at the junction between the inner tunnel 20 and the outer tunnel 40 via the load cell assembly 60 will also act in the vertical direction, which corresponds to the direction the load cell 61 is configured to measure the force carried therethrough.

With respect to the H axis, the first connecting portion 62 is disposed at the same distance from the previously described plane P with respect to the H axis as is the center of mass/gravity of the heat exchanging structure 11 when mounted to the inner tunnel 20 as described hereinabove. Due to the vertical arrangement of the components forming the load cell assembly 60, the load cell 61 and the second connecting portion 63 are also spaced this same distance from the plane P with respect to the H axis. The second connecting portion 63 may connect to the inner tunnel 20 at a position corresponding to that of the center of mass/gravity of the heat exchanging structure 11 with respect to the H and V axes (from the perspective of FIG. 1), as desired.

The inner tunnel 20 further includes an adjustable counterweight assembly 70 coupled thereto. The adjustable counterweight assembly 70 is shown as being disposed on an exterior of the first one of the lateral sidewalls 22 of the inner tunnel 20, but the adjustable counterweight assembly 70 may alternatively be positioned on an exterior of the opposing second one of the lateral sidewalls 22, as desired, or alternatively on the interior of either of the opposing lateral sidewalls 22. The adjustable counterweight assembly 70 includes a base element 71 mounted to the inner tunnel 20 and a counterweight 72 adjustably disposed relative to the base element 71 with respect to a horizontal direction parallel to the axis H. More specifically, the base element 71 may include a track, rail, or similar guiding feature arranged in parallel to the axis H and configured to mate with a corresponding feature of the counterweight 72 to allow for a selective sliding of the counterweight 72 back-and-forth along the horizontal direction parallel to the axis H. The manner in which the counterweight 72 slides horizontally results in the motion of the counterweight 72 being offset from the angle of inclination of the inner tunnel 20 by the same angle as the inclination of the inner tunnel 20 relative to the axis H. A center of mass/gravity of the counterweight 72 may also be disposed at the same height as the axis of rotation formed by the at least one shaft element 50 and the first connecting portion 62 of the load cell assembly 60. The movement of the counterweight 72 in the horizontal direction causes the center of mass/gravity of the counterweight 72 to move a variable distance from the plane P passing through the axis of rotation of the inner tunnel 20 with respect to the axis H. The adjustable counterweight assembly 70 may be adjusted manually or may be associated with an actuator configured to incrementally adjust the position of the counterweight 72, such as a suitable electric motor.

The axis of rotation of the inner tunnel 20 as formed by the at least one shaft element 50 may be positioned with respect to the H and V axes (refer to FIG. 1) to be disposed at or adjacent a center of mass/gravity of the entirety of the inner tunnel 20 and all components thereof that are rotatably supported by the at least one shaft element 50. Many aspects of the inner tunnel 20, such as the mounting position and weight of the heat exchanging structure 11, the amount of water retained instantaneously by the heat exchanging structure 11, and the adjustable position of the counterweight 72, may cause this center of mass/gravity to change during use of the testing apparatus 10, hence the selected position for the at least one shaft element 50 with respect to the H and V axes corresponds to a position at which the inner tunnel 20 may be easily balanced ready to initiate a testing process, as described hereinafter.

A blower assembly 80 is in fluid communication with the flow space 41 of the outer tunnel 40, which is in turn in fluid communication with the flow space 21 of the inner tunnel 20. The blower assembly 80 is configured to cause the flow of the air through each of the flow spaces 21, 41 in the manner described herein when performing certain tests via the testing apparatus 10. The blower assembly 80 is shown as being fluidly connected to the first end 43 of the outer tunnel 40 for forcing the air through the flow spaces 21, 41 in the specified flow direction, but the blower assembly 80 may alternatively be fluidly connected to the second end 44 of the outer tunnel 40 for pulling the air through the flow spaces 21, 41 in the specified flow direction, as desired, without departing from the scope of the present invention. The blower assembly 80 may be adjustable to a plurality of different operational speeds for causing the air to flow through the flow spaces 21, 41 with a plurality of different flow velocities in accordance with the selections of an operator of the testing apparatus 10.

A controller (not shown) of the testing apparatus 10 may be in signal communication with any or all of the liquid delivery device 28, the load cell 61, the adjustable counterweight assembly 70, or the blower assembly 80, as desired. The controller may be configured to control the operational conditions of the liquid delivery device 28, such as when the spray nozzles 29 are activated and at what flow rate the water exits the spray nozzles 29 during certain tests performed via the testing apparatus 10, and to further record such conditions as a function of time. The controller may also, in some embodiments, be configured to adjust the position of the counterweight 72 relative to the plane P when attempting to balance the inner tunnel 20 prior to the initiation of certain tests performed via the testing apparatus 10. The controller may be configured to receive signals from the load cell 61 that correspond to known force values being sensed by the load cell 61, thereby allowing for the controller to monitor and record the reaction force measured by the load cell 61 as a function of time. The controller may also be configured to control the operational conditions of the blower assembly 80, such as controlling when the blow assembly 80 is causing a flow of air through the tunnels 20, 40, at what flow rate the air is flowing, and recording such conditions as a function of time. It should be assumed that those actions discussed hereinafter during an explanation of the method of use of the testing apparatus 10 that are not otherwise described as being performed manually or by an operator are in fact performed via a signal generated by the controller. Such signals may be generated as a part of a preprogrammed and substantially automatic process carried out by the controller or the controller may be configured to only carry out the specified steps when prompted by the operator, or combinations thereof.

First, a method of balancing the inner tunnel 20 relative to the outer tunnel 40 in anticipation of performing a water (liquid) saturation test with respect to the heat exchanging structure 11 is disclosed. The heat exchanging structure 11 is mounted to the inner tunnel 20 such that the center of mass/gravity of the heat exchanging structure 11 is disposed at the same distance from the plane P as is the load cell 61, as described above, thereby aligning the vertical reaction force sensed by the load cell 61 and the vertical force of gravity acting on the center of mass/gravity of the heat exchanging structure 11 with respect to the axis H. Once the heat exchanging structure 11 is properly positioned relative to the inner tunnel 20, the counterweight 72 is adjusted in position relative to the axis H to change the distribution of the weight of the inner tunnel 20 relative to the plane P. As can be seen from a review of FIG. 1, the connection of the inner tunnel 20 to the outer tunnel 40 via the load cell assembly 60 results in the inner tunnel 20 being substantially fixed in rotational position about the at least one shaft element 50 forming the axis of rotation of the inner tunnel 20, hence an imbalance of the inner tunnel 20 does not result in a rotation of the inner tunnel 20 relative to the outer tunnel 40, but instead in the generation of a reaction force within the load cell assembly 60 for balancing all forces acting on the inner tunnel 20 for maintaining the stationary rotational position thereof. The counterweight 72 is adjusted in position until the load cell 61 indicates that the reaction force sensed and measured thereby is zero, which is indicative of the inner tunnel 20 being balanced to each side of the plane P such that the inner tunnel 20 is not urged to rotate in either rotational direction, hence no force is applied to the load cell 61 in a direction tangential to such rotational motion in reaction to such an imbalance. It is of course assumed that any potential deformation or strain experienced within the load cell 61 as a result of operation thereof when experiencing a load, as well as any resulting rotation of the inner tunnel 20 as a result of such deformation or strain within the load cell 61, is negligible for the purposes of the present invention and does not affect the determinations made via use of the testing apparatus 10 as discussed hereinafter.

Once the inner tunnel 20 is balanced about the axis of rotation thereof in the manner described above, the water saturation test is ready and able to be performed. The liquid delivery device 28 is activated to cause the water to be delivered to the facing surfaces of the heat exchanging structure 11 for accumulation on the heat exchanging structure 11. The water accumulating on the heat exchanging structure 11 includes a center of mass/gravity that is substantially identical to that of the heat exchanging structure 11 absent the accumulation of the water, assuming a substantially even distribution of the water on the corresponding surfaces of the heat exchanging structure 11. As such, a downward force resulting from the weight of the water at the center of mass/gravity thereof acts on the inner tunnel 20 at a distance from the plane P that is the same as the distance at which the load cell 61 measures the reaction force caused by the imbalance of the inner tunnel 20 about the axis of rotation thereof. The use of these equal distances results in a tensile force experienced within the load cell 61 being directly opposite and equal to the force acting on the inner tunnel 20 as a result of the weight of any water that has been accumulated on the heat exchanging structure 11. The force measurements determined by the load cell 61 during the water saturation test are accordingly representative of the weight of the water that has thus far accumulated on the heat exchanging structure 11.

The weight measurements of the water as determined by the measurements made via the load cell 61 may be analyzed as a function of time to determine the manner in which the water accumulates on the heat exchanging structure 11. It can be determined that the maximum amount of water that can be accumulated on the heat exchanging structure 11, which corresponds to the heat exchanging structure 11 being saturated with the water, corresponds to a maximum value of the weight of the water accumulated on the heat exchanging structure 11 when water is continually delivered to the heat exchanging structure 11. In other words, the load cell 61 will initially measure a force of zero when the inner tunnel 20 is initially balanced, and will progressively read greater force values as the weight of the accumulated water increases, but will eventually read a substantially constant value when the water being added to the heat exchanging structure 11 can no longer be retained thereon due to the heat exchanging structure 11 being fully saturated with the water. This maximum and eventually constant value can accordingly be correlated to the total weight of the water retained by the heat exchanging structure 11 when the heat exchanging structure 11 is saturated with the water at the corresponding installation orientation.

Following conclusion of the water saturation test, the heat exchanging structure 11 maintains the accumulation of the water thereon and the testing apparatus 10 is ready and able to perform a water (liquid) retention test with respect to the heat exchanging structure 11. The load cell 61 initially reads a force corresponding to the accumulated weight of the water on the heat exchanging structure 11. The blower assembly 80 is activated to cause air to flow through the flow space 41 and then the flow space 21 for encountering the heat exchanging structure 11. The blower assembly 80 causes the air to flow through and/or over the heat exchanging structure 11 at a specified flow rate for a specified period of time. During the blowing of the air, the load cell 61 reads progressively decreasing force values corresponding to the weight of the water being decreased as water is progressively removed from the heat exchanging structure 11 as a result of the force of the air on the water. The water retention test can be performed following each iteration of the water saturation test with respect to different operating conditions, such as different flow rates and different time periods of blowing, in order to determine the conditions necessary for removing a desired quantity (weight) of the water from the heat exchanging structure 11 in response to known air flow conditions, or in order to determine how much water is expected to be retained on the heat exchanging structure 11 following exposure to a flow of air at a known flow rate for a known period of time.

The testing apparatus 10 may further be utilized for performing a freeze test with respect to the water accumulated on the heat exchanging structure 11. The freeze test may be performed with respect to any desired accumulation of the water on the heat exchanging structure 11 and may therefore be performed following completion of the water saturation test or following the subsequent completion of an iteration of the water retention test for removing a desired amount of the water from the heat exchanging structure 11, as desired. The freeze test may include the heat exchanging structure 11 and water accumulated thereon being exposed to ambient air temperatures below freezing for a period of time until the accumulated water freezes, or may otherwise include any other method of transferring heat away from the heat exchanging structure 11 and the accumulated water for facilitating the freezing of the accumulated water. The lowering of the temperature of the air encountering the heat exchanging structure 11 may include the blower assembly 80 directing cooled air into the tunnels 20, 40 until the water is frozen.

The testing apparatus 10 may also be utilized for performing a thaw test following the conclusion of the freeze test. The thaw test may include the heat exchanging structure 11 and the water accumulated thereon being exposed to ambient air temperatures above freezing for a period of time until the frozen water thaws to a desired extent, or may alternatively include any method of transferring heat to the heat exchanging structure 11 and the water accumulated thereon for facilitating the thawing thereof. The raising of the temperature of the air encountering the heat exchanging structure 11 may include the blower assembly 80 directing heated air into the tunnels 20, 40 until the water thaws.

Each of the freeze test and the thaw test may include the continued monitoring of the measurements taken by the load cell 61 to determine any effects of the freezing and/or thawing process on the retention of the water on the heat exchanging structure 11. The transparency of the sidewalls 22, 42 also facilitates visual inspection of the heat exchanging structure 11 during such tests.

The controller of the testing apparatus 10 may be configured to automatically carry out a sequence of the described test procedures with respect to one of the heat exchanging structures 11 once the heat exchanging structure 11 is properly mounted to the inner tunnel 20, wherein these tests are performed via appropriate control signals sent by the controller to the necessary components as described above. For example, the controller may carry out the water saturation test, a desired water retention test with respect to operator selected air flow conditions, and then a freezing test followed by a thawing test with respect to the water still remaining on the heat exchanging structure 11 following the selected water retention test.

It should be readily apparent to one skilled in the art that the testing apparatus 10 may also be adapted for alternative testing procedures in accordance with the disclosure of the present invention, including any possible ordering of any the processes described herein for determining the effects of any sequence of events with respect to the heat exchanging structure 11. For example, the controller may be programmed to perform a series of different test processes with respect to one of the heat exchanging structures 11 including multiple different or repeated steps of spraying the water, removing the water, freezing the water, or thawing the water in order to mimic and test any order of conditions potentially faced by the heat exchanging structure 11.

The testing apparatus 10 is described herein with regards to an inner tunnel 20 rotatably mounted to an outer tunnel 40, wherein each of the tunnels 20, 40 is provided to aid in directing air flow over the heat exchanging structure 11. However, it should be readily apparent to one skilled in the art that the weighing of the water accumulated on the heat exchanging structure 11 can be accomplished without the use of structures forming "tunnels" if there is no subsequent need for air to be passed over the heat exchanging structure 11. For example, the outer tunnel 40 may be formed by any substantially stationary base structure 40 and the inner tunnel 20 may be formed by any support structure 20 that is configured to support the heat exchanging structure 11, that is rotatably coupled to the base structure 40, and that is further connected to the base structure 40 by the load cell assembly 60, so long as the necessary relationships described hereinabove are maintained regarding the manner in which the load cell 61 is configured to measure the weight of the accumulated water via the novel configuration of the testing apparatus 10. In other words, the flow path forming aspects of the tunnels 20, 40 are not necessarily required for the spraying of the water or the measurement of the weight of the water accumulated on the heat exchanging structure 11, hence certain aspects of the invention may be carried out via the use of a combination of a support structure 20 and a base structure 40 absent such flow directing features. The exact same configuration as that shown in FIGS. 1-3 may be utilized absent the presence of flow delimiting sidewalls along the length of each of the sides of each of the structures 20, 40, but while maintaining the remaining relationships with respect to the discloses axes H, L, V.

The described testing apparatus 10 advantageously provides a means to measure the water accumulated on a liquid-retaining heat exchanging structure 11 with respect to an installation orientation thereof, thereby better mimicking actual conditions faced by the heat exchanging structure 11 during operational use within a vehicle. The tunnels 20, 40 may also be arranged to prescribe a specified installation air flow orientation and flow rate of the air encountering the heat exchanging structure 11 that similarly mimics the air flow conditions faced by the heat exchanging structure 11 during operation use within the vehicle. The novel configuration of the testing apparatus 10 allows for a load cell 61 to determine the weight of the accumulated water to a fine resolution, and a monitoring of the load cell 61 measurements as a function of time beneficially reveals when the heat exchanging structure 11 is fully saturated. The test apparatus 10 can beneficially be automatically operated following an initial set-up thereof, thereby allowing for a series of different tests to be performed sequentially.

From the foregoing description, one ordinarily skilled in the art can easily ascertain the essential characteristics of this invention and, without departing from the spirit and scope thereof, can make various changes and modifications to the invention to adapt it to various usages and conditions.

We claim:

1. A testing apparatus comprising:
   a base structure;
   a supporting structure rotatably coupled to the base structure, the supporting structure including an engaging portion configured to engage a liquid-retaining article; and
   a load cell assembly connecting the base structure to the supporting structure, the load cell assembly including a load cell configured to measure a reaction force present between the base structure and the supporting structure resulting from an imbalance of the supporting structure about an axis of rotation thereof, wherein the reaction force corresponds to a weight of liquid that has accumulated on the liquid-retaining article following a balancing of the supporting structure about the axis of rotation thereof, wherein the liquid-retaining article is a heat exchanging structure configured to be installed in a vehicle, wherein the engaging portion of the supporting structure is configured to orient the heat exchanging structure at an inclination corresponding to an inclination of the heat exchanging structure when installed in the vehicle.

2. The testing apparatus of claim 1, further comprising a counterweight assembly coupled to the supporting structure and configured to balance the supporting structure about the axis of rotation thereof prior to the liquid accumulating on the liquid-retaining article.

3. The testing apparatus of claim 2, wherein the counterweight assembly includes a counterweight, wherein a distance the counterweight is spaced from a vertically extending plane arranged parallel to and passing through the axis of rotation of the supporting structure is adjustable to balance the supporting structure about the axis of rotation thereof prior to the liquid accumulating on the liquid-retaining article.

4. The testing apparatus of claim 3, wherein a center of mass of the liquid-retaining article and the counterweight assembly are disposed to opposing sides of the vertically extending plane.

5. The testing apparatus of claim 1, wherein the load cell and a center of mass of the liquid-retaining article are each spaced an equal distance from a vertically extending plane arranged parallel to and passing through the axis of rotation of the supporting structure.

6. The testing apparatus of claim 5, further comprising a counterweight assembly coupled to the supporting structure and configured to balance the supporting structure about the axis of rotation thereof prior to the liquid accumulating on the liquid-retaining article, wherein each of the center of mass of the liquid-retaining article and the load cell are disposed to a first side of the vertically extending plane, and wherein the counterweight assembly is disposed to an opposing second side of the vertically extending plane.

7. The testing apparatus of claim 1, wherein the load cell assembly further includes a first connecting portion coupled to the base structure and a second connecting portion coupled to the supporting structure, wherein the load cell is vertically arranged between the first connecting portion and the second connecting portion.

8. The testing apparatus of claim 7, wherein the first connecting portion is disposed at a same height as the axis of rotation of the supporting structure with respect to a vertical direction.

9. The testing apparatus of claim 8, wherein the first connecting portion and a center of mass of the liquid-retaining article are each spaced an equal distance from a vertically extending plane arranged parallel to and passing through the axis of rotation of the supporting structure.

10. A testing apparatus comprising:
a base structure;
a supporting structure rotatably coupled to the base structure, the supporting structure including an engaging portion configured to engage a liquid-retaining article; and
a load cell assembly connecting the base structure to the supporting structure, the load cell assembly including a load cell configured to measure a reaction force present between the base structure and the supporting structure resulting from an imbalance of the supporting structure about an axis of rotation thereof, wherein the reaction force corresponds to a weight of liquid that has accumulated on the liquid-retaining article following a balancing of the supporting structure about the axis of rotation thereof, wherein the supporting structure forms a tunnel configured to direct a flow of air therethrough, wherein the flow of air is configured to remove at least a portion of the water accumulated on the liquid-retaining article.

11. The testing apparatus of claim 10, wherein the tunnel is inclined relative to a vertical direction.

12. The testing apparatus of claim 10, wherein the tunnel is in fluid communication with a blower assembly configured to direct the flow of air through the tunnel.

13. A testing apparatus comprising:
a base structure;
a supporting structure rotatably coupled to the base structure, the supporting structure including an engaging portion configured to engage a liquid-retaining article; and
a load cell assembly connecting the base structure to the supporting structure, the load cell assembly including a load cell configured to measure a reaction force present between the base structure and the supporting structure resulting from an imbalance of the supporting structure about an axis of rotation thereof, wherein the reaction force corresponds to a weight of liquid that has accumulated on the liquid-retaining article following a balancing of the supporting structure about the axis of rotation thereof, wherein the base structure forms an outer tunnel and the supporting structure forms an inner tunnel disposed within the outer tunnel, wherein a flow space of the outer tunnel is in fluid communication with a flow space of the inner tunnel.

14. A testing apparatus comprising:
a base structure;
a supporting structure rotatably coupled to the base structure, the supporting structure including an engaging portion configured to engage a liquid-retaining article;
a load cell assembly connecting the base structure to the supporting structure, the load cell assembly including a load cell configured to measure a reaction force present between the base structure and the supporting structure resulting from an imbalance of the supporting structure about an axis of rotation thereof, wherein the reaction force corresponds to a weight of liquid that has accumulated on the liquid-retaining article following a balancing of the supporting structure about the axis of rotation thereof; and
a fluid delivery device configured to deliver liquid to the liquid-retaining article for accumulation thereon.

15. A testing apparatus comprising:
an outer tunnel;
an inner tunnel disposed within and rotatably coupled to the outer tunnel, the inner tunnel including an engaging portion configured to engage a liquid-retaining article;
a blower assembly in fluid communication with each of the outer tunnel and the inner tunnel, the blower assembly configured to selectively direct a flow of air through the inner tunnel;
a load cell assembly connecting the outer tunnel to the inner tunnel at a position spaced horizontally from an axis of rotation of the inner tunnel, the load cell assembly including a load cell configured to measure a reaction force present between the outer tunnel and the inner tunnel resulting from an imbalance of the inner tunnel about the axis of rotation thereof, wherein the reaction force corresponds to a weight of liquid that has accumulated on the liquid-retaining article following a balancing of the inner tunnel about the axis of rotation thereof; and a counterweight assembly coupled to the inner tunnel and configured to balance the inner tunnel about the axis of rotation thereof prior to the liquid accumulating on the liquid-retaining article.

16. A method of operating a testing apparatus comprising:

providing a base structure, a supporting structure, and a load cell assembly, the supporting structure rotatably coupled to the base structure and the load cell assembly connecting the base structure to the supporting structure at a position spaced from an axis of rotation of the supporting structure;

supporting a liquid-retaining article on an engaging portion of the supporting structure;

balancing the supporting structure about the axis of rotation thereof after the liquid-retaining article is supported by the engaging portion;

delivering liquid to the liquid-retaining article for accumulation thereon after the balancing of the supporting structure; and measuring a reaction force present between the base structure and the supporting structure resulting from an imbalance of the supporting structure about the axis of rotation thereof following an accumulation of the liquid on the liquid-retaining article, wherein the reaction force is measured by a load cell of the load cell assembly and corresponds to a weight of the liquid that has accumulated on the liquid-retaining article, wherein the liquid-retaining article is a heat exchanging structure configured to be installed in a vehicle, wherein the engaging portion of the supporting structure is configured to orient the heat exchanging structure at an inclination corresponding to an inclination of the heat exchanging structure when installed in the vehicle.

17. The method of claim 16, wherein a liquid saturation test performed via use of the testing apparatus includes the delivering step occurring until the reaction force reaches a maximum value indicating that the liquid-retaining article is saturated with the liquid.

18. The method of claim 16, further comprising a step of passing air over the liquid-retaining article following the delivering of the liquid thereto.

19. The method of claim 18, wherein a liquid retention test performed via use of the testing apparatus includes comparing the reaction force measured by the load cell prior to the passing of the air over the liquid-retaining article to the reaction force measured by the load cell after the passing of the air over the liquid-retaining article to determine a weight of the liquid removed from the liquid-retaining article during the passing of the air over the liquid-retaining article.

* * * * *